United States Patent [19]

Shutic et al.

[11] Patent Number: 5,153,028

[45] Date of Patent: Oct. 6, 1992

[54] METHOD FOR POWDER COATING OBJECTS AND COLLECTING OVERSPRAYED POWDER

[75] Inventors: Jeffrey R. Shutic, Wakeman; Robert J. Holland, Avon; Phillip R. Barnett, deceased, late of Amherst, by Patricia J. Barnett, executrix; Thomas E. Hollstein, Amherst, all of Ohio

[73] Assignee: Nordson Corporation, Westlake, Ohio

[21] Appl. No.: 780,813

[22] Filed: Oct. 22, 1991

Related U.S. Application Data

[62] Division of Ser. No. 510,295, Apr. 16, 1990, Pat. No. 5,078,084.

[51] Int. Cl.⁵ .............................................. B05D 1/12
[52] U.S. Cl. .................................. 427/180; 55/96; 55/302; 55/DIG. 46; 118/312; 118/326; 118/DIG. 7; 427/421; 454/49
[58] Field of Search ............ 118/312, 326, 602, 603, 118/610, DIG. 7; 98/115.2; 55/96, 301, 302, DIG. 46; 239/693; 427/180, 195, 345, 421

[56] References Cited

U.S. PATENT DOCUMENTS

| | | |
|---|---|---|
| 2,521,060 | 9/1950 | Hallinan . |
| 3,073,097 | 1/1963 | Hallett et al. . |
| 3,269,096 | 8/1966 | Smith . |
| 3,480,330 | 11/1969 | Hirs et al. . |
| 3,594,992 | 7/1971 | Carr et al. . |
| 3,714,926 | 2/1973 | Ofner . |
| 3,739,557 | 6/1973 | Anderson et al. . |
| 3,814,002 | 6/1974 | Rombach et al. ............ 55/DIG. 46 |
| 3,847,118 | 11/1974 | Ambry ................................ 118/603 |
| 3,870,375 | 3/1975 | Duncan et al. ..................... 406/127 |
| 3,877,899 | 4/1975 | Bundy et al. . |
| 3,909,222 | 9/1975 | Caughlin et al. . |
| 4,105,562 | 8/1978 | Kaplan et al. . |
| 4,127,397 | 11/1978 | O'Nan, Jr. et al. . |
| 4,150,605 | 4/1979 | Telchuk, Jr. et al. . |
| 4,277,260 | 7/1981 | Browning ..................... 118/DIG. 7 |
| 4,298,474 | 11/1981 | Sillers, Jr. . |
| 4,303,417 | 12/1981 | Koch, II . |
| 4,353,721 | 10/1982 | Mollstatter . |
| 4,395,269 | 7/1983 | Schuler . |
| 4,409,009 | 10/1983 | Lissy ................................... 118/603 |
| 4,491,458 | 1/1985 | Sunter . |
| 4,500,326 | 2/1985 | Sunter . |
| 4,504,293 | 3/1985 | Gillingham et al. . |
| 4,545,324 | 10/1985 | Browning . |
| 4,590,884 | 5/1986 | Kreeger et al. ..................... 98/115.2 |
| 4,662,309 | 5/1987 | Mulder ......................... 55/DIG. 46 |
| 4,704,953 | 11/1987 | Wilson . |
| 4,715,314 | 12/1987 | Ramseier et al. . |
| 4,730,647 | 3/1988 | Mulder ............................... 98/115.2 |
| 4,770,118 | 9/1988 | Vohringer et al. . |
| 4,775,398 | 10/1988 | Howeth . |
| 4,787,330 | 11/1988 | Bolf .................................... 98/115.2 |
| 4,823,731 | 4/1989 | Howeth . |
| 4,824,295 | 4/1989 | Sharpless ............................. 406/109 |
| 4,871,380 | 10/1989 | Meyers . |

FOREIGN PATENT DOCUMENTS 3006837 9/1981 Fed. Rep. of Germany ...... 118/312
0981551 5/1951 France .

Primary Examiner—Michael Lusignan
Assistant Examiner—Terry J. Owens
Attorney, Agent, or Firm—Wood, Herron & Evans

[57] ABSTRACT

A powder coating system particularly adapted for coating large objects such as automotive and other vehicle bodies comprises a spray booth having a manual/robotic spraying area for the application of powder to the inner door flanges and other hard to reach areas of the vehicle body using manually or rotatably operated powder dispensers, and an automatic spraying area wherein the remainder of the vehicle body is coated using automatically manipulated powder dispensers. A powder collection and recovery system is associated with the spray booth which includes removable cartridge filters arranged in V-shaped filter banks within powder collection chambers beneath the floor of the booth, a system for the transfer of powder collected in the powder collection chambers to hoppers located exteriorly of the booth and an air exhaust system for equalizing the negative pressure within clean air chambers which receive clean air after filtering by the cartridge filters.

5 Claims, 7 Drawing Sheets

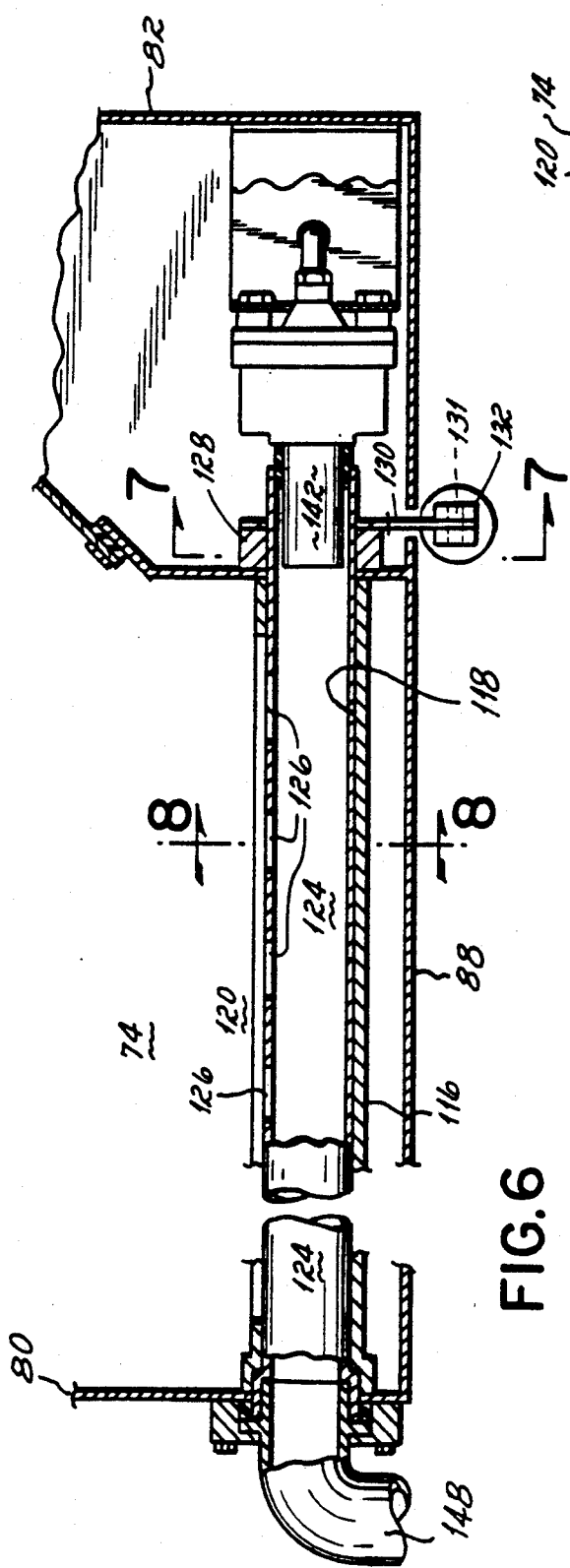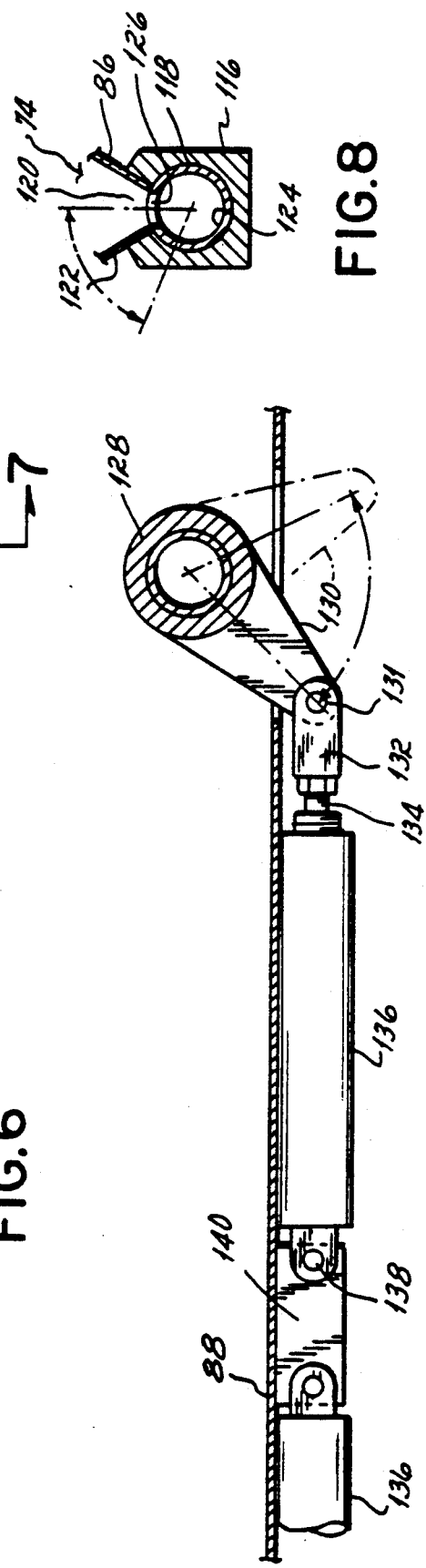

METHOD FOR POWDER COATING OBJECTS AND COLLECTING OVERSPRAYED POWDER

This is a division, of application Ser. No. 07/510,295, filed Apr. 16, 1990, now U.S. Pat. No. 5,078,084.

FIELD OF THE INVENTION

This invention relates to powder coating systems, and, more particularly, to a powder spray booth and powder collection and recovery system adapted for the application of powder coating material onto relatively large objects such as automotive and other types of vehicle bodies.

BACKGROUND OF THE INVENTION

The application of liquid coating materials to large objects such as automotive and other vehicle bodies has conventionally been accomplished in spray booths having an elongated tunnel-like construction formed with an inlet for the ingress of the vehicle body, a coating application area, a curing or drying area in some designs, and an outlet for the egress of the vehicle body. In many systems, "conditioned" air, i.e., humidified and filtered air, is introduced by a blower or feed fan into a plenum chamber at the top of the spray booth and then directed downwardly toward the vehicle body moving through the booth. The conditioned air picks up oversprayed coating material within the booth interior and this air-entrained oversprayed material is drawn downwardly through the floor of the booth by an exhaust fan. Filters are located at the bottom of the booth to capture the oversprayed material, and the resulting filtered or clean air is withdrawn from the booth and either exhausted to atmosphere or recirculated within the system for reuse.

The coating material in most common use for vehicles such as automobiles is a high solids resinous paint material which contains a relatively high percentage of liquid solvent components to facilitate atomization of the resinous material. The problems attendant to the recovery of oversprayed, resinous paint material have been well documented and present a continuing environmental problem for the coating and finishing industry. See, for example, U.S. Pat. No. 4,247,581 to Cobbs et al and 4,553,701 to Rehman et al.

As an alternative to solvent-based liquid paint material, the use of powder coating material has been proposed for application to vehicle bodies and other relatively large objects. In the practice of powder coating, a powdered resin is applied to the substrate and then the substrate and powder are heated so that the powder melts and when subsequently cooled, forms a solid continuous coating on the substrate. In most powder spraying applications, an electrostatic charge is applied to the sprayed powder which is directed toward a grounded object to be coated so as to increase the quantity of powder which attaches to the substrate and to assist in retaining the powder on the substrate.

As disclosed, for example, in U.S. Pat. No. 3,847,118, the application of powder material onto large objects such as automotive or other vehicle bodies has been performed in a spray booth which provides a control area wherein oversprayed powder which is not deposited on the vehicle body can be collected. Containment of the oversprayed powder within the booth in apparatus of this type is aided by an exhaust system which creates a negative pressure within the booth and causes the oversprayed powder to be drawn through the booth and into a powder collection and recovery system. The recovered oversprayed powder can be saved for future use or immediately recycled to powder dispensers associated with the spray booth.

It has been observed that the application of powder coating material onto large objects such as automotive bodies presents a number of difficulties, many of which can be attributed to the large physical size of the spray booth and the large quantity of powder coating material required to coat vehicle bodies. Many powder coating systems do not have the capacity to collect and recover the large quantity of oversprayed powder obtained from coating a vehicle body. Additionally, access to the various components of the powder collection and recovery system, particularly the powder filters, for maintenance and/or replacement is difficult in many prior powder coating booth designs. This is of particular concern in a spray booth for vehicle bodies wherein a large quantity of powder material must be collected and recovered.

SUMMARY OF THE INVENTION

It is therefore among the objectives of this invention to provide a powder spraying system for applying powder coating material onto large objects such as automotive or other vehicle bodies which is effective to provide a uniform coating of powder material onto the entire vehicle body, which is capable of efficiently and effectively collecting and recovering large quantities of oversprayed powder and which is easy to maintain and repair.

These objectives are accomplished in an apparatus for applying powder coating material onto large objects such as automotive or other types of vehicle bodies which includes a powder spray booth having a ceiling, a floor, opposed side walls, and opposed end walls formed with an inlet and outlet, respectively, which define an interior providing a controlled area within which to apply powder coating material onto vehicle bodies conveyed through the booth. Conditioned air is introduced through plenums at the ceiling of the booth which, after picking up oversprayed powder material which does not adhere to the vehicle bodies, is drawn downwardly through a powder collection and recovery system beneath the booth where the oversprayed powder is collected within powder collection chambers to produce filtered or clean air which is withdrawn through clean air chambers into a clean air plenum for subsequent discharge to atmosphere.

In one aspect of this invention, a two-step operation is employed to apply the powder coating material onto the vehicle body in the course of its movement through the interior of the spray booth. Preferably, the interior of the booth is formed with a manual or robotic spraying area near the inlet of the booth which has a relatively large cross sectional area. Downstream from the manual/robotic spraying area is an automatic spraying area having a smaller cross sectional area. In the manual/robotic spraying area, the side walls of the booth are sufficiently spaced from one another to permit the doors of the vehicle body to be fully opened. This allows either hand-held or robotically manipulated powder dispensers to coat the inner flange areas of the doors and other hard to reach areas of the vehicle body. The vehicle body is then conveyed into the automatic spraying area, with the doors closed, where automatically operated powder dispensers apply powder material to the remainder of the vehicle body without manual intervention. The vehicle body is then conveyed from the automatic spraying area out of the booth interior to an oven or the like where the vehicle body and powder are heated so that the powder melts to form a solid continuous coating on the vehicle body.

Another important aspect of this invention is the powder collection and recovery system which is capable of effectively collecting and recovering a relatively large quantity of oversprayed powder, and which is relatively easy to maintain. In the presently preferred embodiment, the vehicle bodies are conveyed along the center of the booth interior and a number of side-by-side powder collection chambers extend longitudinally along the length of the booths on both sides of the center portion of the booth, beneath its floor. Each of these powder collection chambers contains a bank of cartridge filters which filter the powder material from the air drawn from the booth interior to produce clean air which enters a clean air chamber located within each powder collection chamber. Each bank of cartridge filters comprises two rows of individual filters with the rows oriented at an angle relative to one another in generally a V-shape. In this position, each cartridge filter in a row is angled relative to the bottom of the powder collection chamber so that when powder collected on the exterior surface thereof is dislodged by a reverse jet of air from a blow-back device within the interior of the clean air chamber, the powder can fall by gravity into the bottom of the powder collection chamber.

In the presently preferred embodiment, each of the individual cartridge filters within a bank is removably mounted to the housing of the clean air chamber within a powder collection chamber. The housing of the clean air chamber mounts a female connector and each cartridge filter has a male connector mounted to its base which threadedly engages the female connector. In order to avoid leakage of powder from the powder collection chamber into the clean air chamber, a gasket is interposed between the cartridge filter and housing of the clean air chamber. This construction permits each cartridge filter to be easily installed and removed from the clean air chamber and, because the cartridge filters are angled relative to the clean air chamber, they can be accessed through the floor of the spray booth by removing a grating overlying the cartridge filters.

Another important aspect of this invention involves the transport of oversprayed powder material collected within the powder collection chambers to a hopper or other storage container located outside of the booth. In the presently preferred embodiment, a pair of inductor mounting blocks are located at the base of each powder collection chamber. These inductor mounting blocks are formed with a passageway and a longitudinally extending powder inlet along the top portion thereof which receives oversprayed powder collected at the bottom of the powder collection chamber. An inductor tube is rotatably carried within each inductor mounting block, and these inductor tubes are formed with longitudinal slots to receive the oversprayed powder material passing through the powder inlet of the inductor mounting blocks.

As mentioned above, there are a number of powder collection chambers on either side of the center portion of the booth which extend side-by-side along the length of the booth. Preferably, each powder collection chamber contains two inductor tubes. The inductor tubes within the powder collection chambers located on one side of the spray booth are all connected to a first header pipe which extends longitudinally along the length of the spray booth, and the inductor tubes within the powder collection chambers located on the opposite side of the booth connect to a second header pipe. An air accumulator is connected to one end of each of the header pipes, and a MINITRANSPORTER or other powder collection device is connected to the opposite end of each header pipe outside of the spray booth.

Once the inductor tubes become filled with collected, oversprayed powder, a mechanism rotates each inductor tube individually within an associated inductor mounting block so as to create at least a partial seal between the slots in the inductor tube and the wall of the mounting block. A burst or jet of air is then introduced into the interior of the inductor tubes which conveys the powder therein in dilute phase into the header pipes on either side of the booth. The air accumulators are then operative to introduce a volume of air into the header pipes which convey the powder therein in dense phase to the MINITRANSPORTERS located at the opposite end of the header pipes exteriorly of the spray booth.

As mentioned above, the air introduced at the top of the booth, together with air-entrained, oversprayed powder material, is drawn into the powder collection chambers by exhaust fans connected to a clean air plenum beneath the floor of the booth. In another aspect of this invention, it has been found desirable to balance the negative pressure applied by the exhaust fans within the interior of the clean air plenum so that the negative pressure within each clean air chamber associated with the powder collection chambers is substantially equal.

This is initially achieved in the instant invention by interposing an adjustable damper between each individual clean air chamber and the clean air plenum. This adjustable damper comprises a pair of hinged damper plates which are movable toward and away from one another to either open or close the flow path for the clean air between the clean air chamber and clean air plenum. Because the exhaust fans which withdraw air from the clean air plenum may be located at opposite ends of the spray booth, adjustment of the dampers associated with each clean air chamber is advantageous to ensure that the negative pressure created within the clean air chambers at the ends of the spray booth is substantially equal to the negative pressure within the clean air chambers located at the middle of the spray booth.

The dampers associated with each clean air chamber provide an initial adjustment of the negative pressure therein, but the negative pressure changes as powder is collected on the cartridge filters, and the quantity of powder on one bank of filters may differ from that collected on another bank. In order to compensate for this change in negative pressure within different clean air chambers during operation of the powder spray booth herein, a static air probe is located within each clean air chamber to sense the negative pressure therein. The static air probe is connected to a pressure transmitter, which, in turn, is connected to a controller. When the negative pressure within a clean air chamber drops below a predetermined minimum level, the pressure transmitter sends a signal to the controller which then activates reverse air jets within the clean air chamber to dislodge collected powder from the cartridge filters and restore the appropriate pressure level within the clean air chamber. This ensures that essentially the same negative pressure, i.e., an equilibrium state, is maintained within the clean air chambers at the ends and middle of the booth during its operation.

DESCRIPTION OF THE DRAWINGS

The structure, operation and advantages of the presently preferred embodiment of this invention will become further apparent upon consideration of the following description, taken in conjunction with the accompanying drawings, wherein:

FIG. 6 is a cross sectional view of an inductor tube and inductor mounting block taken generally along line 6—6 of FIG. 3;

FIG. 7 is a cross sectional view taken generally along line 7—7 of FIG. 6 illustrating the mechanism for rotating an inductor tube;

FIG. 8 is a cross sectional view taken generally on line 8—8 of FIG. 6 illustrating the position of the inductor tube before and after rotation;

DETAILED DESCRIPTION OF THE INVENTION

With reference to the Figures, the powder coating system 10 of this invention includes components for the application of powder coating material onto objects such as automotive or other vehicle bodies, for the collection and recovery of oversprayed powder material and for the balanced exhaust of filtered or clean air from the booth. These various components are described separately below.

POWDER SPRAY BOOTH

Figure 1:
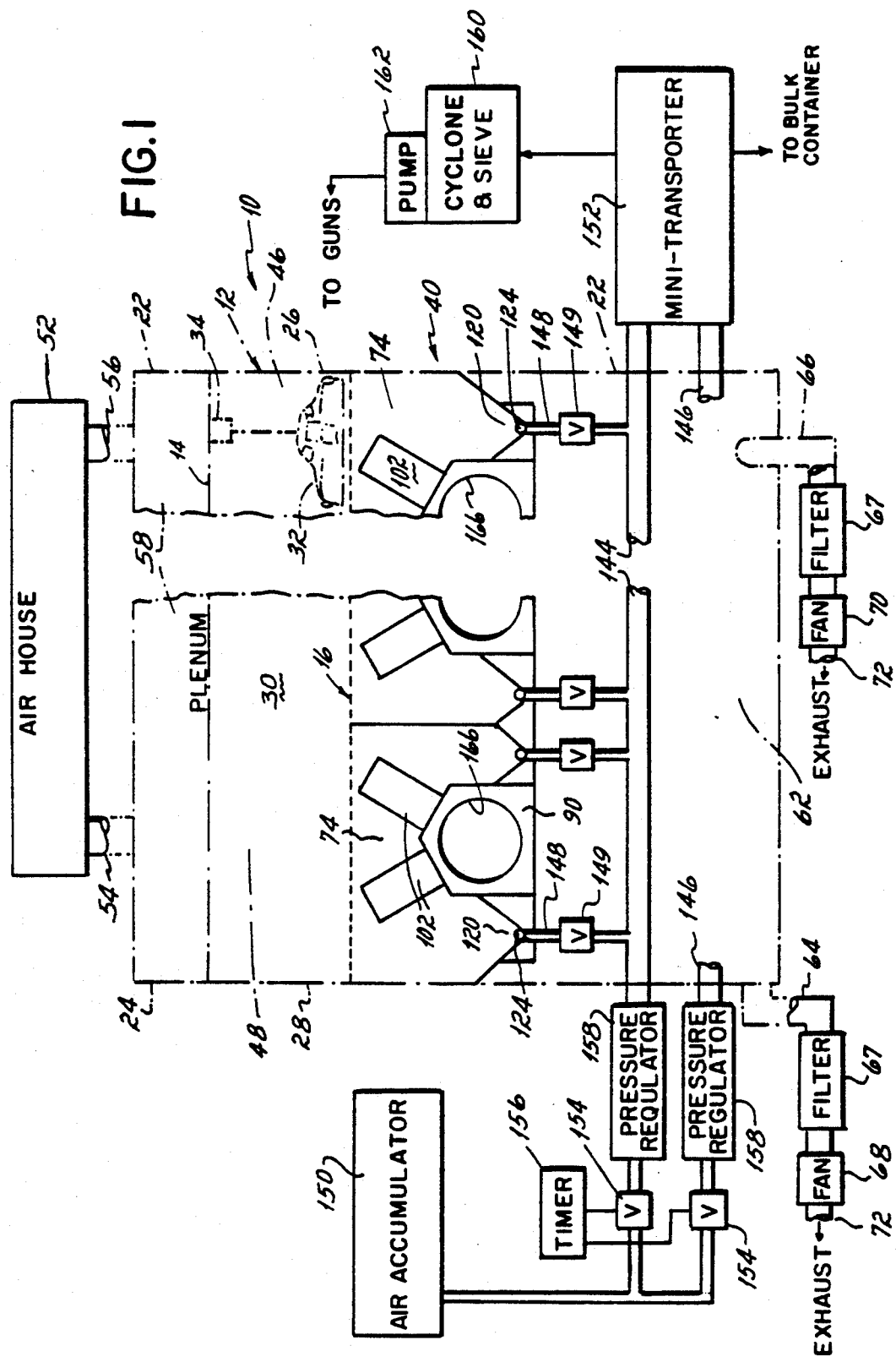
FIG. 1 is a partial, schematic view of the overall powder spraying system of this invention.
Figure 2:
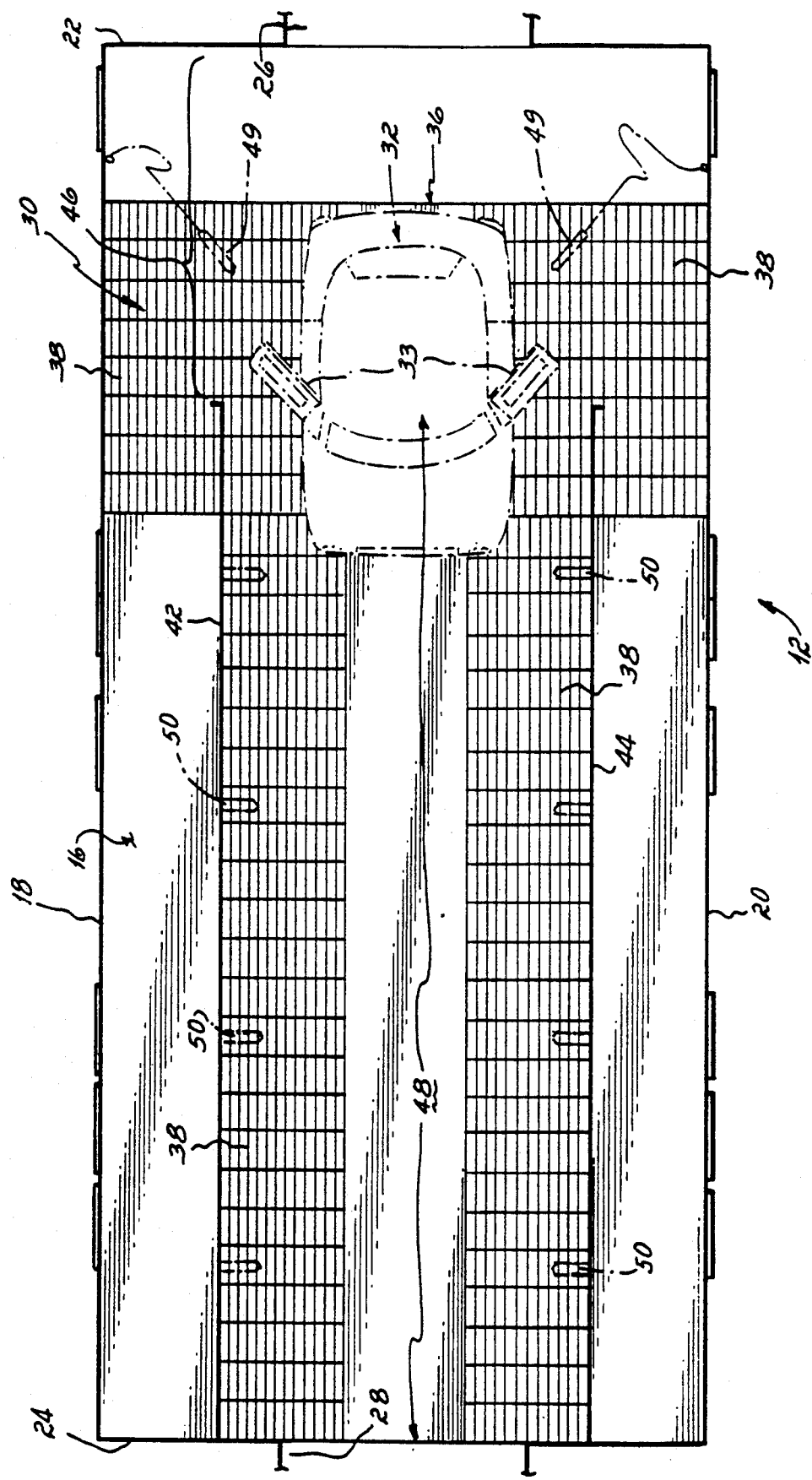
FIG. 2 is a schematic, plan view of the powder spray booth illustrating a vehicle body within the manual/robotic spray area and automatic spraying area, and the powder dispensers associated with same.
Figure 3:
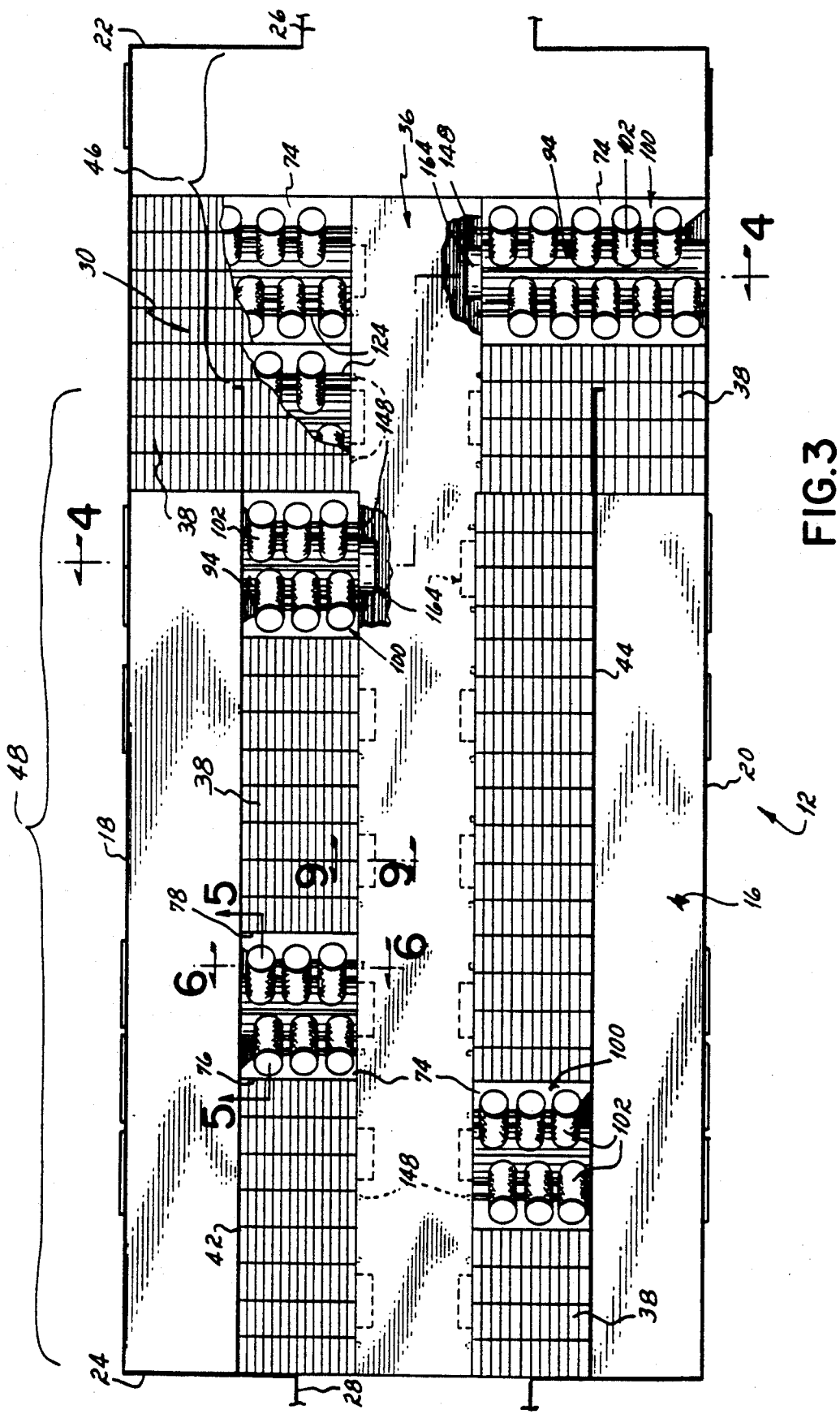
FIG. 3 is a plan view of the spray booth illustrating the gratings in the floor and several banks of cartridge filters.

Referring to FIGS. 1 and 2, the system 10 includes a spray booth 12 having a ceiling 14, floor 16, opposed outer side walls 18, 20, and opposed end walls 22, 24 formed with a booth inlet 26 and a booth outlet 28, respectively. This construction of spray booth 12 defines an interior 30 forming a controlled area in which to apply powder coating material onto objects such as a vehicle body 32 moved by a conveyor 34 through the longitudinally extending center portion 36 of the spray booth 12. Oversprayed powder material which does not adhere to the vehicle body 32 passes through gratings 38 located along the floor 16 of the spray booth 12, on either side of the center portion 36, and into a powder collection and recovery system 40 which is described in detail below.

As best seen in FIG. 2, the interior 30 of powder spray booth 12 also includes a pair of inner side walls 42 and 44, spaced inwardly from the outer walls 18, 20, respectively, which extend longitudinally from the end wall 24 near the booth outlet 28 toward the end wall 22. A space is formed between the end wall 22 and the leading edge of the inner side walls 42, 44 which forms a manual/robotic spraying area 46 whose cross sectional area is defined by the ceiling 14, floor 16 and the outer side walls 18, 20 of the booth 12. Downstream from this manual/robotic spraying area 46, in between the inner side walls 42, 44, is an automatic spraying area 48 which is defined by the ceiling 14, floor 16 and the inner side walls 42, 44 and has a smaller cross sectional area than that of spraying area 48.

A spray coating operation performed within the booth 12 of this invention includes a two-stage powder coating application sequence. Initially, a vehicle body 32 is transported by the conveyor 34 through the booth inlet 26 into the manual/robotic spraying area 46 within the booth interior 30. As shown in FIG. 2, this manual/robotic spraying area 46 has sufficient cross sectional area to permit opening of the doors 33 of the vehicle body 32 without contacting the outer side walls 18, 20. In this manual/robotic spraying area 46, hand-held or robotically manipulated spray guns 49 apply powder coating material onto the inner flange areas of the doors of the vehicle body 32 and any other hard to reach areas as desired. After application of the powder material manually, the vehicle doors 33 are closed and the vehicle body 32 continue on into the automatic spraying area 48. In the automatic spraying area 48, spray guns 50 are manipulated by robot arms or other automatic mechanisms (not shown) to apply powder coating material to the remainder of the vehicle body 32. The vehicle body 32 is then removed from the automatic spraying area 48 and conveyed toward the end wall 24 and out the booth outlet 28 for further treatment.

In the presently preferred embodiment, the vehicle body 32 is held at ground potential by the conveyor 34 and an electrostatic charge is imparted to the powder coating material by the spray guns 49, 50. The details of the spray gun operation form no part of this invention per se and are not discussed herein. The electrostatic charge applied to the powder material increases the quantity of powder which adheres to the vehicle body 32, and assists in retaining powder thereon, but a relatively large quantity of powder material is nevertheless "oversprayed" or fails to adhere to the vehicle body 32. This oversprayed powder must be collected and recovered in the course of the powder coating operation, as described below.

POWDER COLLECTION AND RECOVERY SYSTEM

Referring now to FIGS. 1 and 3-8, the powder collection and recovery system 40 of this invention is illustrated in detail. One aspect of the powder recovery operation performed by system 40 is to provide a flow of "make-up" or outside air into the booth interior 30 to entrain the oversprayed powder material within such air and convey it to the collection and recovery system described below. In the presently preferred embodiment, this air supply system includes an air house 52 which is connected by feed ducts 54 and 56 to an air plenum 58 mounted to the ceiling 14 of the spray booth 12. The air house 52 is of conventional design and is adapted to provide "conditioned" air, i.e., filtered and humidified air, through the feed ducts 54, 56 and into the plenum 58 which introduce the conditioned air into the manual/robotic and automatic spraying areas 46, 48.

Figure 4:
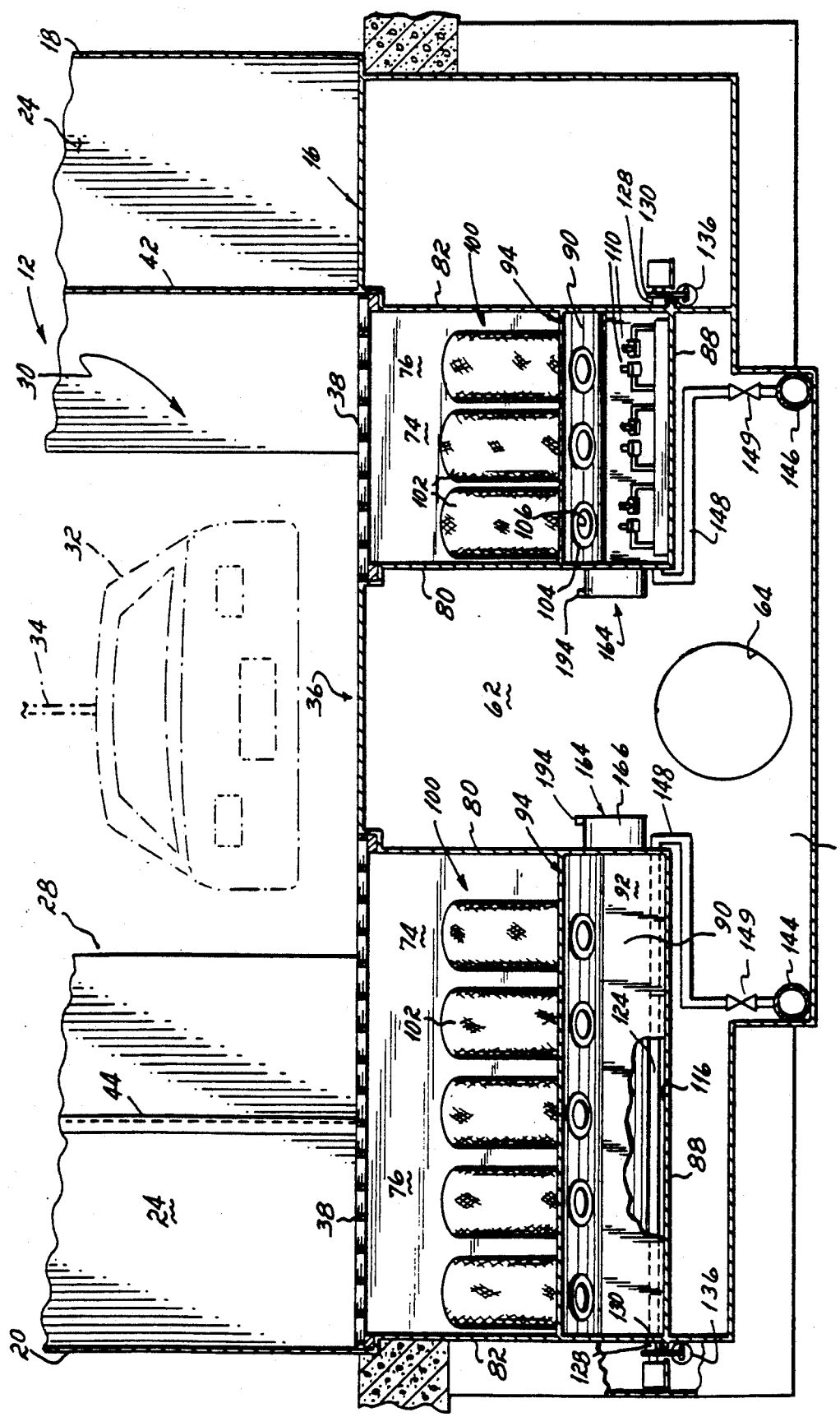
FIG. 4 is a cross sectional view of a portion of the spray booth, and the powder collection and recovery system beneath the spray booth, taken generally along line 4—4 of FIG. 3.

As depicted in FIGS. 1 and 4, and described in more detail below, a clean air plenum 62 is formed beneath the floor 16 of the spray booth 12 which receives "clean air" after filtering of the over-sprayed powder. The clean air plenum 62 is connected by a pair of exhaust ducts 64, 66 through a pair of final filters 67 to a pair of exhaust fans 68, 70, respectively. These exhaust fans 68, 70, in turn, are each connected to discharge ducts 72 which discharge clean air to atmosphere. Alternatively, if desired, clean air can be recycled through the air house 52 and reused. As described more fully below, the exhaust fans 68, 70 are operative to draw air supplied by the air house 52, together with air-entrained, over-sprayed powder material, from the booth interior 30 and into the powder collection and recovery system 40 beneath the booth 12. The oversprayed powder is filtered within the powder collection and recovery system 40 to produce filtered or clean air which is drawn into the clean air plenum 62 by the exhaust fans 68, 70 and then transmitted through the exhaust ducts 64, 66 to the discharge ducts 72 for discharge to atmosphere.

Figure 5:
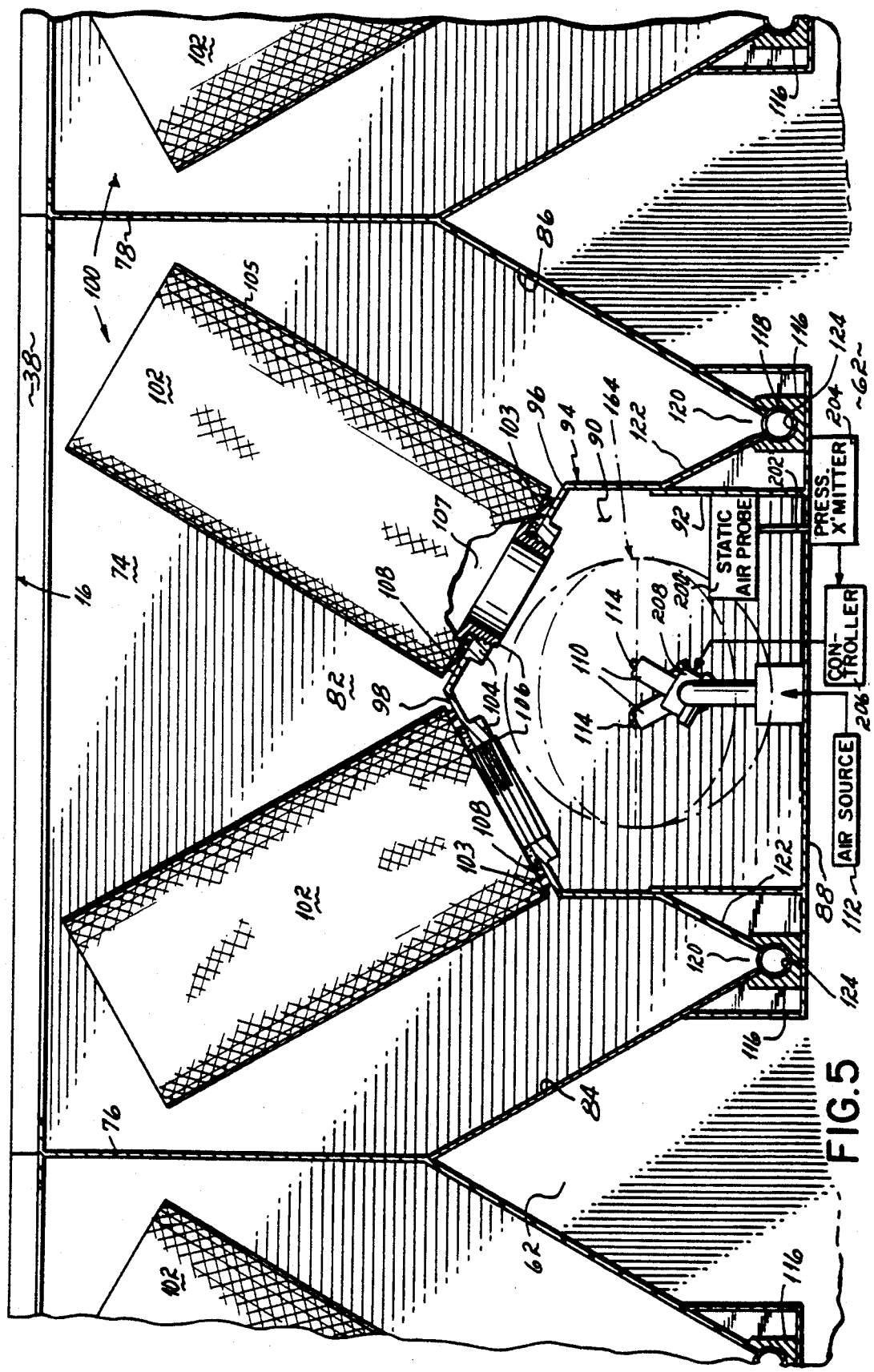
FIG. 5 is a cross sectional view of a powder collection chamber and an associated clean air chamber taken generally along line 5—5 of FIG. 3.

The powder collection and recovery portions of the system 40 are located beneath the floor 16 of the spray booth 12. Preferably, a number of powder collection chambers 74 are disposed side-by-side and extend longitudinally along the length of the spray booth 12 on each side of the center portion 36 thereof beneath the gratings 38. As shown in FIGS. 4 and 5, each powder collection chamber 74 comprises a pair of side walls 76, 78 which are common to adjacent chambers 74, an inner wall 80 closest to the center portion 36 of booth 12, an outer wall 82 and downwardly angled lower walls 84, 86 which are connected to a base 88. As discussed below, oversprayed powder material is drawn into each powder collection chamber 74, and/or falls therein by gravity, and is directed toward the base 88 along the angled lower walls 84, 86.

A clean air chamber 90 having a base portion 92 connected to a removable service cover 94 is contained within each of the powder collection chambers 74. In the presently preferred embodiment, the cover 94 of clean air chamber 90 is formed with side walls 96, 98 which are angled relative to one another and relative to the base 88 of powder collection chamber 74. As viewed in FIGS. 3–5, the angled side walls 96, 98 of cover 94 are adapted to mount a bank 100 of cartridge filters 102 each having a filter body formed with a base 103 and a cylindrical-shaped wall 105 defining a hollow interior 107. Each bank 100 of cartridge filters 102 comprises two rows of spaced filters 102, arranged in a V-shape on the cover 94, wherein one row of filters 102 is mounted to the side wall 96 of cover 94 and the other row of filters 102 is mounted to the side wall 98 thereof. In the larger, manual/robotic spraying area 46, each bank 100 includes ten cartridge filters 102, whereas the banks 100 in the smaller, automatic spraying area 48 each include six cartridge filters 102. Preferably, the cartridge filters 102 within one row of each filter bank 100 are staggered or offset relative to the filters 102 in the other row of such filter bank 100. See FIG. 3.

With reference to FIGS. 4 and 5, in one aspect of this invention, structure is provided for removably mounting each cartridge filter 102 to the cover 94 of clean air chamber 90. In the presently preferred embodiment, the side walls 96, 98 of the cover 94 of clean air chamber 90 are each formed with spaced openings within which internally threaded, female connectors 104 are mounted. These female connectors 104 threadedly engage a male connector 106 mounted to the base 103 of each cartridge filter 102. As shown in FIG. 5, a rubber gasket 108 is interposed between the base 103 of each cartridge filter 102 and the side walls 96 or 98 of cover 94 to seal the clean air chamber 90 from the powder collection chamber 74. This threaded connection between the cartridge filters 102 and cover 94 of clean air chamber 90 facilitates replacement of the filters 102 which can be easily accessed through the gratings 38 in the floor 16 of the booth 12.

As shown in FIGS. 4 and 5, a series of nozzles 110 connected to a source 112 of pressurized air are mounted within the interior of each clean air chamber 90. One nozzle 110 is provided for each cartridge filter 102 mounted to the cover 94 of clean air chamber 90, and these nozzles 110 each have a discharge outlet 114 which is aligned with the center of one of the cartridge filters 102. Each nozzle 110 is operative to introduce a reverse pulse or jet of pressurized air into the interior of a cartridge filter 102 to dislodge powder material collected on the exterior surface thereof. Because the cartridge filters 102 are carried at an angle by the cover 94 relative to the base 88 of powder collection chamber 74, the powder material dislodged from the filters 102 by the reverse air jets falls by gravity onto the angled lower walls 84, 86 and toward the base 88 of powder collection chamber 74.

Having collected the oversprayed powder material within the powder collection chamber 74, the powder collection and recovery system 40 is operative to then transmit the collected powder to a hopper or container located outside of the booth 12 for either storage or reuse. The powder recovery aspect of system 40 is best illustrated in FIGS. 1 and 4–8.

In the presently preferred embodiment, a pair of inductor mounting blocks 116 are affixed to the base 88 of each powder collection chamber 74 on opposite sides of the clean air chamber 90 therein. Each mounting block 116 includes a passageway 118 and a longitudinally extending powder inlet 120 which is connected on one side to one of the lower walls 84, 86 of powder collection chamber 74, and on the opposite side to an angled wall 122 which extends to the base 92 of clean air chamber 90. Oversprayed powder material falling into the base of powder collection chamber 74 is thus directed by the angulated walls 84, 86 and 122 into the longitudinal powder inlet 120 of the inductor mounting block 116.

As shown in FIGS. 5 and 6, the passageway 118 of mounting block 116 carries an inductor tube 124 formed with a number of spaced slots 126 along the upper surface thereof. A tube sleeve 128 is mounted to the outside of inductor tube 124, and this tube sleeve 128 is fixedly connected to one end of an armature 130. The armature 130, in turn, is pivotally mounted by a pin 131 to a connector plate 132 carried at one end of a piston 134 movable within a cylinder 136. The end of cylinder 136 opposite piston 134 is pivotally mounted by a pin 138 to a bracket 140 carried on the base 88 of powder collection chamber 74. As viewed in FIG. 7, the bracket 140 also carries a cylinder 136 associated with the inductor tube 124 in an adjacent powder collection chamber (not shown).

The aforementioned structure illustrated in FIGS. 5-7 is provided for the purpose of transmitting collected, oversprayed powder from the base of the powder collection chamber 74 to a location toward the center 36 of the booth 12 where it can be removed from the booth 12 as described below. This is accomplished as follows. The powder material which is directed by angulated walls 84, 86 and 122 into the inlet 120 of each mounting block 116 with the powder collection chamber 74 enters each inductor tube 124 through the slots 126 in its upper surface. At periodic intervals, the inductor tube 124 must be cleared of powder material collected therein. This is achieved in a two-step operation. First, the cylinder 136 is activated to extend piston 134 so that the armature 130 is moved from the position depicted in solid lines in FIG. 7 to the position illustrated in phantom lines therein. Movement of the armature 130 in this direction is permitted by the pivotal connections between the armature 130 and connector plate 132, and between the cylinder 136 and bracket 140.

In response to movement of the armature 130, the inductor tube 124 is rotated within the mounting block 116 so that the slots 126 at the top of inductor tube 124 are moved from a powder intake position in alignment with the powder inlet 120 of mounting block 116, to a powder discharge position in which the slots 126 are located against the wall of the mounting block 116. See FIG. 8. Movement of the slots 126 in the inductor tube 124 to the powder discharge position creates at least a partial seal within the interior of inductor tube 124. A blast or jet of air is then delivered into the inductor tube 124 through a valve 142 mounted at one end thereof which is connected to a source of pressurized air. See FIG. 6. This burst of pressurized air moves the powder collected within inductor tube 124 in dilute phase out of the inductor tube 124 toward the center portion 36 of spray booth 12. The cylinder 136 is then operated to retract the piston 134 which moves the armature 130 in the opposite direction and thus rotates the inductor tube 124 to a powder intake position wherein its slots 126 align with the powder inlet 120 of an inductor mounting block 116.

Referring now to FIGS. 1 and 4, structure is illustrated for receiving the powder material from the inductor tubes 124 and transmitting such material from the spray booth 12. In the presently preferred embodiment, a first header pipe 144 extends longitudinally along the length of spray booth 12 on one side of the center portion 36 thereof, and a second header pipe 146 extends longitudinally along the length of the booth 12 on the opposite side of center portion 36. Each header pipe 144, 146 receives oversprayed powder from all of the side-by-side powder collection chambers 74 on their respective sides of the booth 12, and is identical in structure and operation. Only the first header pipe 144 is described in detail herein, it being understood that the same discussion and reference numbers apply to the second header pipe 146.

Each inductor tube 124 associated with the powder collection chambers 74 along one side of spray booth 12 is joined by a connector pipe 148 to the header pipe 144. Preferably, a duck bill-type one-way valve 149 is mounted in each connector pipe 148 between the inductor tube 124 and header pipe 144 to prevent flow of powder material in a reverse direction, i.e., from the header pipe 144 into the inductor tubes 124. Although it is contemplated that a number of one-way valves could be employed, one presently preferred valve is a TIED-FLEX Series 33 check valve manufactured by the Red Valve Company of Carnegie, Pa.

As shown in FIG. 1, one end of header pipe 144 is connected to an air accumulator 150 and the opposite end of header pipe 144 is connected to a powder hopper or MINITRANSPORTER 152 located exteriorly of the booth 12. One type of MINITRANSPORTER which has been found suitable for use is the Series 353 MINITRANSPORTER supplied by Dynamic Air Conveying Systems of St. Paul, Minn. A valve 154 operated by a timer 156, and a pressure regulator 158 are mounted to the header pipe 144 immediately downstream from the air accumulator 150. At periodic intervals, after powder material has been transmitted into the header pipe 144 from the inductor tubes 124, the air accumulator 150 is effective to introduce a volume of pressurized air into the header pipe 144. The valve 154 is opened by the timer 156 for this purpose, and the pressure regulator 158 is effective to control the pressure of the volume of air from accumulator 150. The pressurized air transmits the powder material in dense phase through the header pipe 144 and into the MINITRANSPORTER 152. The MINITRANSPORTER 152 can be operated to either introduce the powder material into a bulk container (not shown) or to a cyclone and sieve unit 160 having a powder pump 162 which delivers the powder back to a virgin powder hopper (not shown), from which it is pumped to the spray guns 49, 50 for reuse of the powder.

EXHAUST AIR BALANCING SYSTEM

As discussed above, a flow of air is introduced into the booth interior 30 by the air house 52 which carries with it oversprayed powder material into the powder collection chambers 74. Movement of such air, and the air-entrained powder material, into the powder collection chamber 74 is induced by the exhaust fans 68, 70 connected to the clean air plenum 62. These exhaust fans 68, 70 draw air and air-entrained powder material from the booth interior 30 and into the powder collection chamber 74 where the powder either falls to the chamber base 88 or is collected on the cartridge filters 102. The cartridge filters 102 remove the powder from the air stream to produce filtered or "clean" air which is drawn into the clean air chambers 90 associated with each powder collection chamber 74 for discharge into the clean air plenum 62.

Another feature of this invention is the provision of air flow control means between each of the clean air chambers 90 and the clean air plenum 62 so that the draw or negative pressure within each clean air chamber 90 created by exhaust fans 68, 70 can be initially set to be substantially equal. The air flow control means is necessary because the exhaust ducts 64, 66 are connected at essentially opposite ends of the clean air plenum 62, and thus the negative pressure in those areas nearer the exhaust ducts 64, 66 is greater than that further away or toward the middle of the clean air plenum 62.

Figure 10:
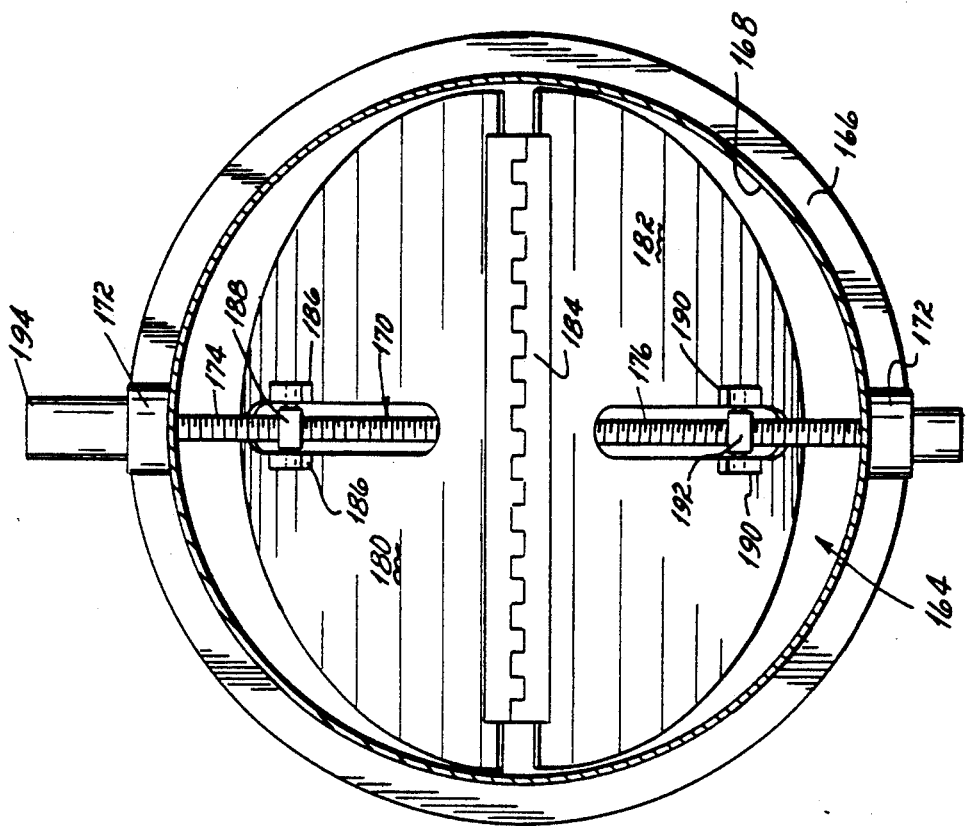
FIG. 10 is a cross sectional view of the adjustable damper of FIG. 9 taken generally along line 10—10 of FIG. 9.
Figure 9:
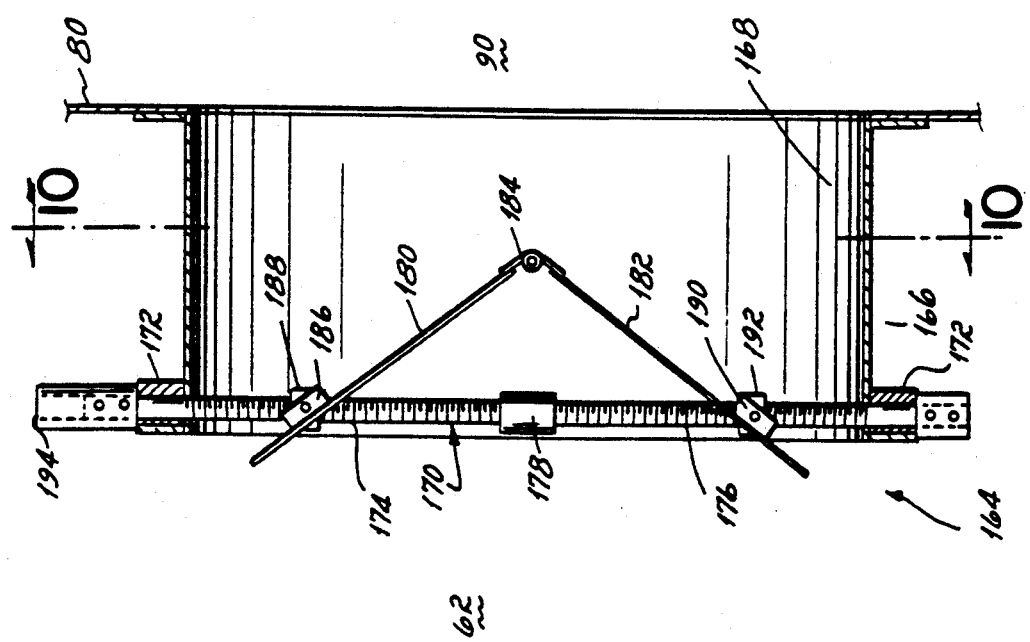
FIG. 9 is a cross sectional view of an adjustable damper associated with each clean air chamber taken generally along line 9—9 of FIG. 3.

The air flow control means employed in this invention comprises an adjustable damper 164 mounted within a housing 166 located between each clean air chamber 90 and the clean air plenum 62. As viewed in FIGS. 9 and 10, the damper housing 166 is formed with an annular opening 168 interconnecting the clean air chamber 90 with the clean air plenum 62. A shaft 170 is rotationally mounted by bearings 172 across the opening 168 in housing 166, and this shaft 170 is formed with a righthand threaded portion 174 and a lefthand threaded portion 176 interconnected by a coupler 178.

The shaft 170 carries a pair of semicircular-shaped, damper plates 180 and 182 having facing edges which are pivotally interconnected by a hinge 184. The damper plate 180 is pivotally mounted by a connector 186 to a nut 188 movable along the righthand threaded portion 174 of shaft 170. Similarly, the damper plate 182 is pivotally mounted by connector 190 to a nut 192 movable along the lefthand threaded portion 176 of shaft 170. In response to rotation of the shaft 170, e.g., by turning an end 194 of shaft 170 with a tool (not shown), the nuts 188, 192 are movable either toward one another to move the damper plates 180, 182 together to a fully open position; or, the nuts 188, 192 are movable away from one another to move the damper plates 180, 182 apart to a fully closed position across the opening 168 in the damper housing 166.

Movement of the damper plates 180, 182 between the open and closed positions, or any intermediate position therebetween, controls the flow of air from the clean air chamber 90 into the clean air plenum 62. This permits initial adjustment of the negative pressure or draw within the interior of each clean air chamber 90 so that the negative pressure within all clean air chambers 90 is substantially the same. Because the damper plates 180, 182 of the adjustable damper 164 are movable toward and away from one another in generally the same direction as the movement of air from the clean air chamber 90 into the clean air plenum 62, the damper plates 180, 182 minimize resistance to the movement of air therepast. This is advantageous in the system of this invention because less resistant to air flow allows the overall power requirements of the exhaust fans 68, 70 to be reduced. Considering the large size of the spray booth 12 employed herein, such reduction of such power requirements can result in significant energy savings.

As mentioned above, the air flow control means or dampers 164 are employed to obtain an initial balancing or equilibrium wherein the negative pressure within each of the clean air chambers 90 is substantially equal regardless of their position relative to exhaust fans 68, 70. In the presently preferred embodiment, structure is provided to help maintain this pressure equilibrium during operation of the spray booth 12. It has been found that in the course of operation of spray booth 12 the oversprayed powder collected on cartridge filters 102 affects the draw or negative pressure within the associated clean air chamber 90, and the amount of powder collected on the filters 102 of one bank 100 may be different from that collected on another bank 100. In order to take into account this pressure variation within the clean air chamber 90, each clean air chamber is provided with a static air probe 200, such as the static air probe Model SAP4 sold by Air Monitor Corporation, which is effective to sense the pressure within clean air chamber 90. The static air probe 200 is connected by a tube 202 to a pressure transmitter 204 such as a Veltron pressure transmitter, which, in turn, is connected to a controller 206. If the pressure within any one clean air chamber 90 drops below a predetermined level, the pressure transmitter 204 associated with that chamber 90 sends a signal to the controller 206 which then operates a valve 208 connected to the reverse air jet nozzles 110 within that chamber 90 to introduce a burst of pressurized air into the associated cartridge filters 102 and dislodge the collected powder thereon, as described above. This restores the appropriate negative pressure within any given chamber 90 and thus maintains balanced pressure conditions during operation of the spray booth 12.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. The method of applying powder coating material onto an object, comprising:
   - spraying powder coating material onto objects moving through the interior of a spray booth;
   - drawing air and air-entrained, oversprayed powder material which does not adhere to the objects from the interior of the spray booth into a powder collection chamber;
   - directing the powder entering the powder collection chamber through powder openings in a powder receiving device connected to the powder collection chamber so that the powder is collected within the interior of the powder receiving device;
   - sealing the powder openings in the powder receiving device; and
   - introducing pressurized air into the interior of the powder receiving device with its powder openings sealed to force the powder therein out of the powder receiving device and into a recovery means for storage or reuse.

2. The method of claim 1 in which said step of introducing pressurized air into the interior of the powder receiving device comprises forcing the powder within said powder receiving device into a header pipe, and then introducing a volume of pressurized air into the interior of the header pipe to force the powder therein into a hopper means located exteriorly of the spray booth.

3. The method of applying powder coating material onto objects, comprising:
   - spraying powder coating material onto objects moving through the interior of a spray booth;
   - drawing air and air-entrained, oversprayed powder material which does not adhere to the objects from the interior of the spray booth into a number of powder collection chambers wherein the oversprayed powder is collected and filtered from the air to form clean air;
   - creating a negative pressure within a number of clean air chambers each connected to one of the powder collection chambers to draw the clean air into each clean air chamber;
   - drawing the clean air out of each of the clean air chambers into a common clean air plenum; and
   - initially adjusting the flow of clean air between each of the clean air chambers and the common clean air plenum so that the negative pressure within each of the clean air chambers is substantially equal.

4. The method of claim 3 in which said step of initially adjusting the flow of clean air between the clean air chambers and the common clean air plenum comprises adjusting a damper interposed between each clean air chamber and the common clean air plenum between an open position and a closed position so that the negative pressure within all clean air chambers is initially substantially equal.

5. The method of applying powder coating material onto objects, comprising:

dispensing powder coating material onto objects moving through the interior of a spray booth;

drawing air and air-entrained, oversprayed powder material which does not adhere to the objects from the interior of the spray booth into a number of powder collection chambers wherein the oversprayed powder is collected and filtered from the air by filters to form clean air for discharge into a number of clean air chambers each connected to the filters and to one of the powder collection chambers;

creating a negative pressure within each of the clean air chambers to draw the filtered, clean air into the clean air chambers;

drawing the clean air out of each of the clean air chambers into a common clean air plenum;

initially adjusting the flow of clean air between each of the clean air chambers and the common clean air plenum so that the negative pressure within each of the clean air chambers is initially substantially equal;

sensing the negative pressure within each of the clean air chambers as the oversprayed powder coating material is collected on the filters connected thereto; and dislodging the collected powder coating material from the filters connected to any one of the clean air chambers in the event the negative pressure sensed within such clean air chamber falls below a predetermined level.

* * * * *